Dec. 28, 1965  S. DUBIN  3,225,620
MULTIPLE RATIO STEERING SYSTEM
Filed Oct. 5, 1962  3 Sheets-Sheet 1

INVENTOR.
SOL DUBIN
BY
Alfred W. Barber
ATTORNEY

Dec. 28, 1965    S. DUBIN    3,225,620
MULTIPLE RATIO STEERING SYSTEM
Filed Oct. 5, 1962    3 Sheets-Sheet 2

INVENTOR.
SOL DUBIN
BY
*Alfred W. Barber*
ATTORNEY

Dec. 28, 1965  S. DUBIN  3,225,620
MULTIPLE RATIO STEERING SYSTEM
Filed Oct. 5, 1962  3 Sheets-Sheet 3
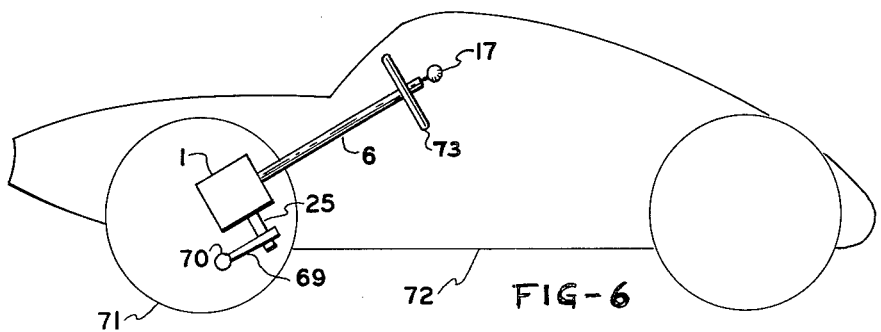
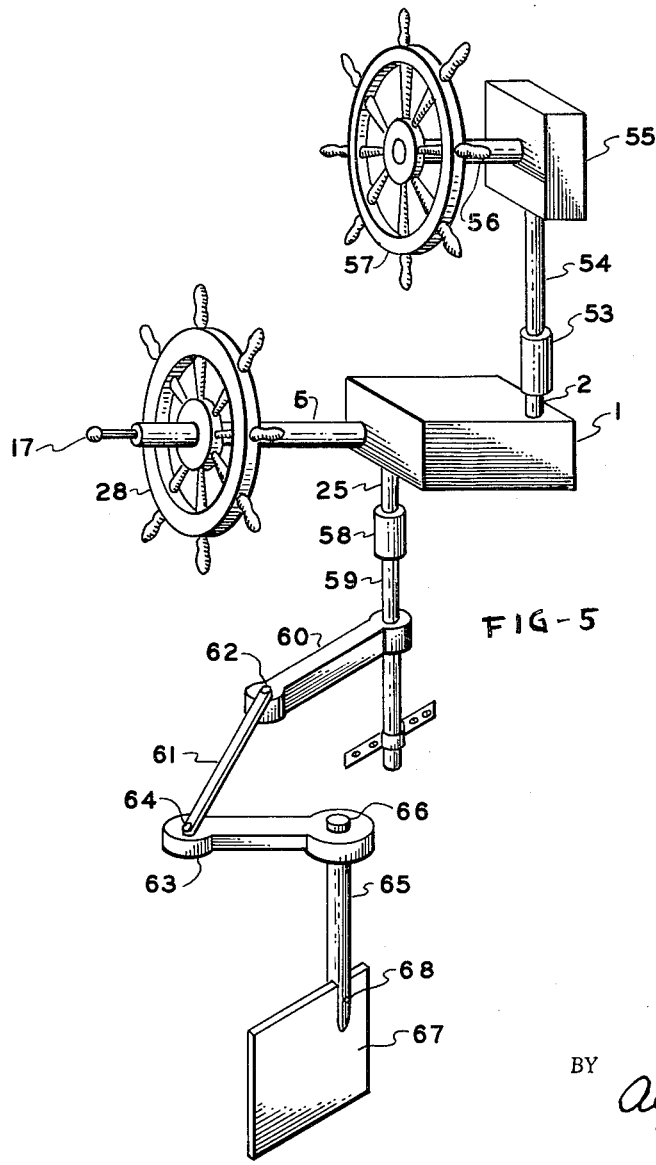
INVENTOR.
SOL DUBIN
BY
Alfred W. Barber
ATTORNEY United States Patent Office 3,225,620
Patented Dec. 28, 1965

3,225,620
MULTIPLE RATIO STEERING SYSTEM
Sol Dubin, Rockville Centre, N.Y.
(217 Merrick Road, Amityville, N.Y.)
Filed Oct. 5, 1962, Ser. No. 228,518
8 Claims. (Cl. 74—500)

The present invention concerns steering devices suitable for use in boats, automobiles and the like.

The steering of boats and automobiles is usually accomplished by means of a steering wheel coupled to rudder or wheels through a steering column and a set of gears. The ratio between input and output of the gears determines the rate at which the steering wheel turns the rudder of the boat or the wheels of the automobile. When a boat or automobile is operated at moderate or high speed, the steering is relatively easy and a low steering ratio is suitable. However at low speed and especially during parking operations a higher ratio is desirable. Power steering has been utilized to meet the problem of steering at different speeds. While power steering is one solution to the problem it is rather expensive and complicated.

It has been found, according to the present invention, that a simple and effective gear shift mechanism can be utilized to provide an inexpensive solution to the problem of steering easily and properly at both high and low speeds. In its preferred form this gear shifting system utilizes two selectable steering ratios which differ by a presently determined factor as, for example, 2:1 speed. The rudder in this case is coupled to the gear system through a non-reversible coupling as is, for example, provided by a worm and worm gear of suitable ratio to provide irreversibility. The wheels, in the case of a vehicle, may be coupled to the gear system through a reversible coupling as is, for example, provided by a worm and worm gear suitable in pitch and tooth angle to provide reversibility. Between the worm and worm gear coupling and the steering column is a set of gears for providing the two desired ratios. One set of gears is located concentrically with the steering column, and a simple push-pull gear shift lever is fitted within the steering column and terminating in a handle at the center of the steering wheel. Gear shifting is done by means of a simple linear slide motion and is facilitated by shaping the gear teeth to minimize clashing or hanging up. The non-reversible coupling, in one case, prevents the rudder from swinging free when the gears are being shifted and are between ratio positions, and in the case of a vehicle with the reversible coupling, shifting, as a safety measure, is only accomplished when the vehicle is not in motion. Friction of the vehicle's steering mechanism and of the tires in contact with the road when the vehicle is not in motion will prevent the wheels from swinging freely when the gears are being shifted and are betwen the ratio positions. Shifting can also be easily accomplished when the vehicle's wheels are introducing a back load into the system through the reversible coupling when the gears are being shifted and are momentarily between the ratio positions.

In the case of the boat steering system, a bevel gear arrangement permits a second steering position, as on a flying bridge, to be coupled into the system.

Accordingly, the principal object of the present invention is to provide a method of and means for changing the steering ratio in boats, automobiles and the like.

Another object is to provide a simple, effective and inexpensive ratio change means for steering systems of boats, automobiles and the like.

A further object is to provide a gear change system for steering means for boats, automobiles and the like, with provisions to prevent gear clashing or hanging-up of the gears.

A still further object is to provide a gear change system for steering means of boats, automobiles and the like, with provisions which prevent the rudder or wheels, as the case may be, from swinging free between shift positions.

These and other objects will be apparent to those skilled in the art from the detailed description of the invention given in connection with the various figures of the drawing.

In the drawing:

FIGURE 5 is a diagrammatic view of another embodiment of the present invention in a boat steering system.

FIGURE 6 is a diagrammatic view of a further embodiment of the present invention in an automobile steering system.

Figure 1:
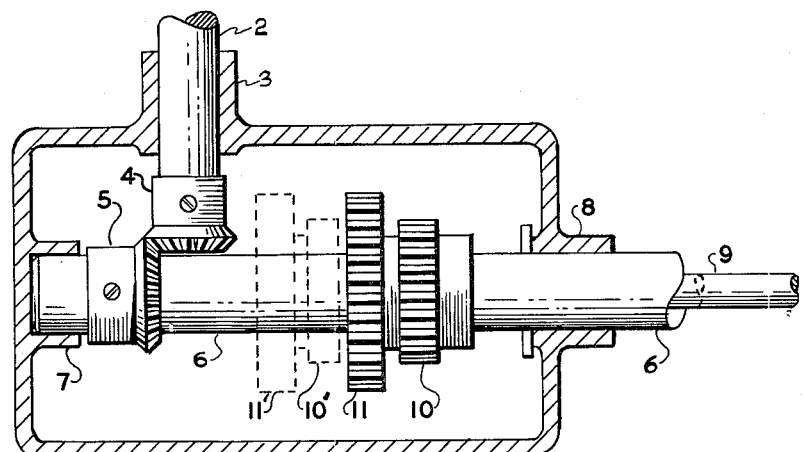
FIGURE 1 is a plan view, partly in section, of the preferred gear arrangement of the present invention.

FIG. 1 shows a box-like housing 1 supporting bushing 3 for shaft 2, and bushings 7 and 8 for shaft 6. A steering wheel, not shown, will be utilized to control shaft 2 and its attached bevel gear 4 which in turn rotates bevel gear 5 and attached shaft 6. Shaft 6 carries the two spur gears 10 and 11 which are interconnected, for example, by welding or by bolts, not shown, to form a unitary gearing assembly rotatable with and slidable to and fro along shaft 6. Connected gears 10 and 11 have different pitch diameters in predetermined ratios as, for example, two to one. While spur gears 10 and 11 are keyed to shaft 6 and turned by its motion, they are also pinned to concentric shaft 9 which when pushed or pulled will move gears 10 and 11, respectively, to and from the dotted positions. This description so far covers the input arrangement of the gears.

Figure 2:
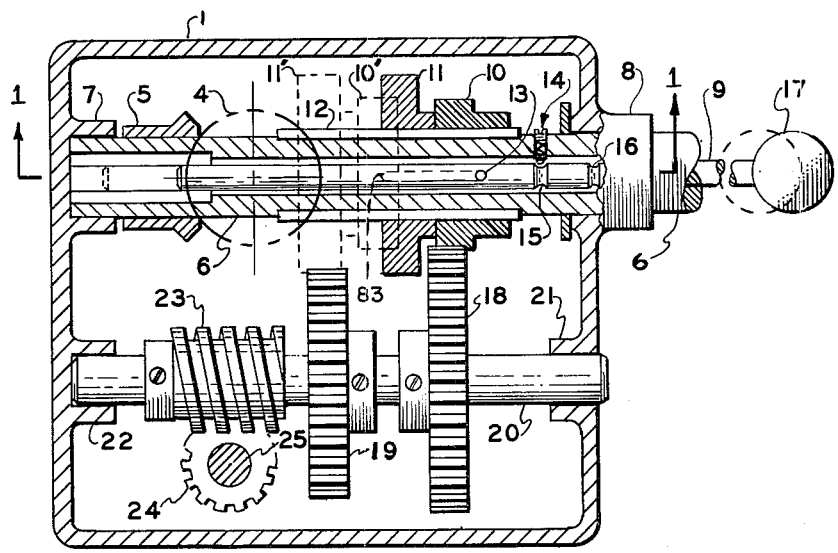
FIGURE 2 is another view of the gear arrangement of FIG. 1.

FIG. 2 is a view of the gears which shows how they are coupled to an output shaft 25. Gears 10 and 11 are turned by shaft 6 since they are keyed to it by key 12. The axial positions of gears 10 and 11 relative to shaft 6 are determined by the axial position of shaft 9 since gears 10 and 11 are connected together and are rigidly connected to shaft 9 by means of pin 13. A slot 83, shown dotted around pin 13, represents a slot formed in shaft 6. Pin 13 passes through slot 83 and the slot 83 permits the axial movement of pin 13 required to slide gears 10 and 11 between the full and dotted line positions shown along shaft 6. A spring loaded detent, shown generally at 14, mates with either annular groove 15 or annular groove 16 and holds the shiftable gear assembly, comprised of connected gears 10 and 11, in either of two shifted positions. Shaft 6 also mounts a steering wheel 28 at its outer end (see FIGURE 5). Shaft 20 turns worm 23 which turns worm gear 24 keyed to shaft 25. When the various gears are in the positions shown in solid lines, spur gear 10 is meshed with spur gear 18 and input shaft 2 turns output shaft 25 in a ratio which depends on the relative ratios of gears 4, 5, 10, 18, 23 and 24. When handle 17 on shaft 9 is pushed in, gears 10 and 11 assume the positions shown as dotted 10' and 11' and gear 11 meshes with gear 19. Since gears 10 and 11 are different by a predetermined ratio, the ratio between input shaft 2 and output shaft 25 is changed by the same ratio. When gears 10 and 11 are shifted they will be free at one position since the outside dimension axially of combined gears 10 and 11 is less than the inside dimension axially between gears 18 and 19. The output shaft 25 carries the worm gear 24 which forms an irreversible combination with worm 23 so that when gears 10 and 11 are being shifted, whatever load is connected to output shaft 25 cannot back-up on the gear system or shift its position, until the gears are again in mesh.

Figure 3:
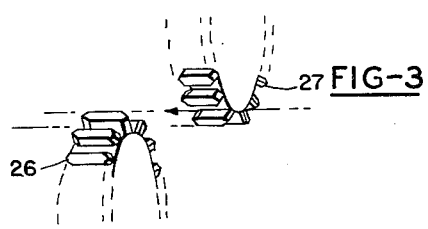
FIGURE 3 is a detail of the gear teeth.

In order to facilitate shifting and without resorting to the complications of synchronous gearing systems, the teeth on gears 10, 11, 18 and 19 are beveled as shown at 26 and 27 in FIG. 3. With this beveled shape, the gears can be easily and quickly shifted by pushing or pulling handle 17 as the case may be, and the gears will slip from one ratio to the other with a minimum of clashing. In the combination in which this gearing system is to be used, it will be seen that the gears will be shifted when there is little or no relative motion.

An alternate input to the gearing system with the object of driving output shaft 25 is through shaft 6 which may also carry a steering wheel, not shown. Thus, for example, the system may employ two inputs, one on shaft 2 and one on shaft 6 in which either one can control the motion of output shaft 25.

Figure 4:
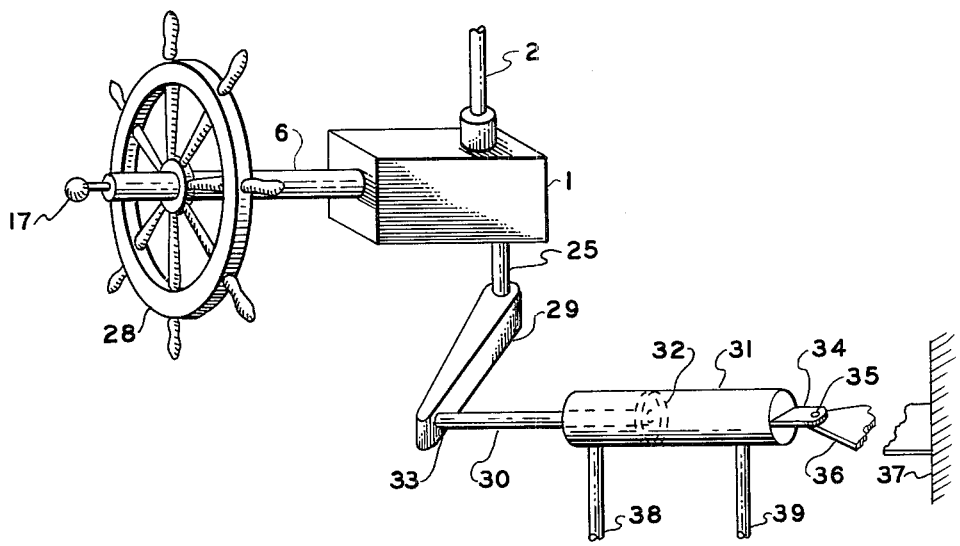
FIGURE 4 is a diagrammatic view of one embodiment of the present invention in a boat steering system.
Figure 4:
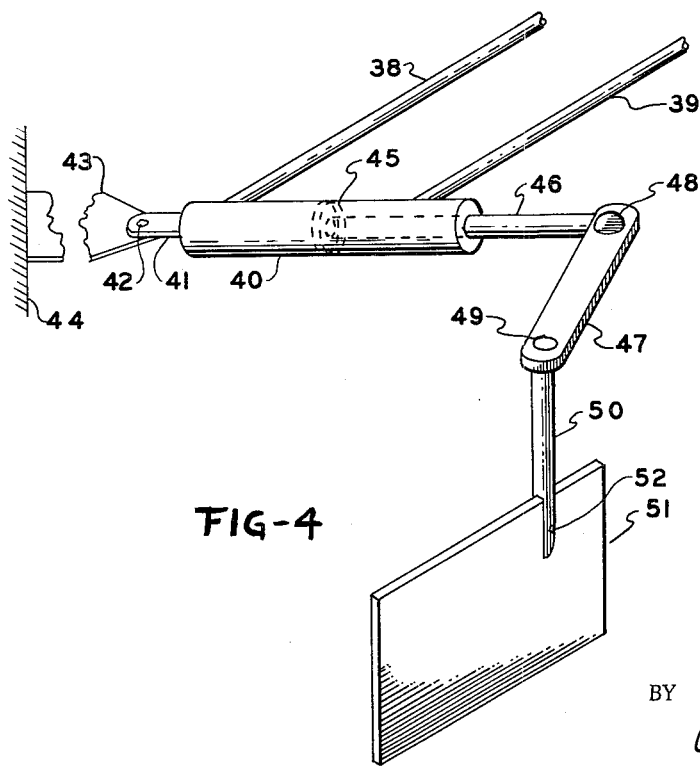

FIG. 4 shows the gearing system above described in detail in connection with FIGS. 1 and 2 in combination with the steering system of a boat. The housing 1 contains the gearing system above described and it carries the two input shafts 2 and 6 and the output shaft 25. Input shaft 6 carries a steering wheel 28 through the center of which projects the shift knob 17. Shaft 2 may go to another steering wheel, not shown, such as one on a flying bridge. The gear controlled output shaft 25 is linked to the rudder 51 by a suitable linkage such as the hydraulic system shown. Shaft 25 carries and actuates arm 29 which in turn actuates plunger 32 in hydraulic cylinder 31 by means of shaft 30 connected to arm 29 by suitable means at 33. Hydraulic cylinder 31 is held by some suitable means such as flange 34 linked at 35 to a flange 36 on support 37. The cylinder 31 contains suitable hydraulic fluid which is forced in and out of tubes 38 and 39 connecting with a second hydraulic cylinder 40. Cylinder 40 carries an output piston 45–46 and is held in a suitable manner as by flanges 41 and 43 joined at 42 and supported at 44. Piston 45–46 actuated in response to the motion of piston 32 over hydraulic lines 38 and 39 turns rudder 51 over a suitable linkage consisting of arm 47 hinged at 48 and shaft 50 secured to arm 47 at 49. Thus rudder 51 is turned by wheel 28 at a ratio determined by the setting of the gears in box 1 as determined by the position of shift knob 17.

Another combination is shown in FIG. 5 where the linkage from output shaft 25 to rudder 67 is mechanical. The linkage includes a suitable series of arms and shafts such as that shown including shaft 59 connected to shaft 25 by coupling 58, arm 60, link 61, arm 63 and shaft 65. Link 61 is pivoted on arm 60 at 62 and on arm 63 at 64. Shaft 65 is secured to arm 63 at 66 and to rudder 67 at 68. This figure shows wheel 28 carried by input shaft 6 and gear shift knob 17. It also shows a second steering wheel 57 which, for example, located on a flying bridge, not shown, turns input shaft 2 through a suitable gear and linkage. Wheel 57 turns shaft 56 which is geared to shaft 54 by gears, not shown, in box 55. Shaft 54 is coupled to shaft 2 by means of coupling 53. Thus, two alternating steering positions are provided with each passing through the gear shift system in box 1.

FIG. 6 shows another combination in which the gear shift system in box 1 as described above is applied to an automobile steering system. The automobile 72 shown in extremely simplified form has a front wheel 71 controlled by linkage 69–70 secured to output shaft 25. The input shaft 6 carries steering wheel 3 through the center of which projects the shift knob 17. Thus, the two speed steering ratio system of the present invention is readily used in an automobile to provide a low ratio for easy parking and a higher ratio for normal driving.

While only a few forms of the present invention have been shown and described, many modifications will be apparent to those skilled in the art and within the spirit and scope of the invention as set forth in particular in the appended claims.

What is claimed is:

1. In a steering device, the combination of a hollow input shaft adapted to carry a steering means, two first gears of different pitch diameters connected together and slidably mounted on said input shaft for concurrent movement therealong and keyed to said input shaft for rotation therewith, a second shaft coupled to means to be steered and carrying two second gears of different pitch diameters, one of said first gears being adapted in one position along said input shaft to mesh with one of said second gears to provide a first speed combination between said input shaft and said second shaft, the other of said first gears being adapted in another position along said input shaft to mesh with the other of said second gears to provide a second speed combination between said input shaft and said second output shaft, means supporting said shafts and the four said gears in such manner as to permit said meshing of said gears, push-pull gear shifting means including a gear shifting shaft coaxial with and extending from the inside center of said input shaft, and coupling means between said gear shifting shaft and the two said first gears adapted to shift said first gears by sliding said first gears along said input shaft into said one or another position to provide either one or the other of said speed combinations whereby said steered means is driven by said steering means in one of two alternately selectable speed ratios, said input shaft having a slot in one portion thereof, and said coupling means including a pin extending through said slot and coupled to one of said first gears and to said gear shifting shaft.

2. A steering device as set forth in claim 1 and including a coupling on said second shaft comprising a worm adapted to drive a worm gear coupled to said means to be steered.

3. A steering device as set forth in claim 1 and including a second input shaft adapted to carry a second steering means and gear means coupling said two input shafts.

4. A steering device as set forth in claim 1 and including a second input shaft and a pair of bevel gears coupling said hollow and second input shafts.

5. A steering device as set forth in claim 1 and including hydraulic means coupled between said second shaft and all of said means to be steered.

6. A steering device as set forth in claim 1 wherein said gears are provided with teeth beveled at their ends to facilitate meshing.

7. In a steering system, the combination of, a hollow input shaft, a steering wheel coupled to one end of said shaft, two rigidly interconnected first gears of different pitch diameters keyed to the other end of said shaft and axially movable thereon, an axially movable shaft mounted inside said input shaft, means for coupling said axially movable shaft to said gears for moving said gears between at least two positions controlled by lengthwise movement of said axially movable shaft, a third shaft coupled to third and fourth gears, means for supporting and positioning said third shaft and said input shaft in such relative locations that said third gear will mesh with one of said first gears when said first gears are in one of said positions and said fourth gear will mesh with the other of said first gears when said first gears are in another of said positions, and output shaft coupled to said third shaft whereby said axially movable shaft comprises gear shifting means for providing two predetermined gear ratios between said input and output shafts, said input shaft including a slot in one portion thereof, and said means for coupling said axially movable shaft to said first gears including a pin extending through said slot and coupled to one of said first gears and to said axially movable shaft.

8. A steering system as set forth in claim 7 wherein said output shaft means is coupled to said third shaft by a worm coupled to said third shaft and a worm gear coupled to said output shaft to provide an irreversible coupling therebetween.

References Cited by the Examiner
UNITED STATES PATENTS

| | | | |
|---|---|---|---|
| 737,442 | 8/1903 | Mooers | 76—462 |
| 1,588,395 | 6/1926 | Winn | 74—498 |
| 1,715,077 | 5/1929 | Tenney et al. | 74—339 |
| 1,909,330 | 5/1933 | Banker | 74—498 |
| 2,453,949 | 11/1948 | Ulinski | 74—496 X |
| 2,508,057 | 5/1950 | Bishop | 74—496 X |
| 3,053,103 | 9/1962 | McAninch et al. | 74—342 |

FOREIGN PATENTS 1,081,549  6/1954  France.

BROUGHTON G. DURHAM, *Primary Examiner.*